US008902505B2

(12) United States Patent
Scott et al.

(10) Patent No.: US 8,902,505 B2
(45) Date of Patent: Dec. 2, 2014

(54) OPTO-MECHANICAL JOINT ASSEMBLIES

(71) Applicants: Jon David Edward Scott, Salt Spring Island (CA); Allen James Upward, Vancouver (CA); Peter George Friedel, Burnaby (CA); Mark Richard Mosher, Whistler (CA)

(72) Inventors: Jon David Edward Scott, Salt Spring Island (CA); Allen James Upward, Vancouver (CA); Peter George Friedel, Burnaby (CA); Mark Richard Mosher, Whistler (CA)

(73) Assignee: SunCentral, Inc., Richmond (CA)

( * ) Notice: Subject to any disclaimer, the term of this patent is extended or adjusted under 35 U.S.C. 154(b) by 24 days.

(21) Appl. No.: 13/627,279

(22) Filed: Sep. 26, 2012

(65) Prior Publication Data

US 2013/0084040 A1 Apr. 4, 2013

Related U.S. Application Data

(60) Provisional application No. 61/541,305, filed on Sep. 30, 2011.

(51) Int. Cl.
*G02B 27/00* (2006.01)
*G02B 17/00* (2006.01)
*F21S 11/00* (2006.01)

(52) U.S. Cl.
CPC .................................... *F21S 11/00* (2013.01)
USPC ........................................ 359/593; 359/597

(58) Field of Classification Search
CPC .................................................. F21S 11/002
USPC .......... 359/591, 592, 597; 126/685, 698, 700
See application file for complete search history.

(56) References Cited

U.S. PATENT DOCUMENTS

| | | | | | |
|---|---|---|---|---|---|
| 4,246,477 | A | * | 1/1981 | Latter | 250/214 AL |
| 4,340,812 | A | * | 7/1982 | Mori | 359/591 |
| 4,389,085 | A | * | 6/1983 | Mori | 359/591 |
| 4,411,490 | A | * | 10/1983 | Daniel | 126/648 |
| 4,943,141 | A | * | 7/1990 | Mori | 359/591 |
| 4,984,880 | A | * | 1/1991 | Mori | 359/597 |
| 5,169,456 | A | | 12/1992 | Johnson | |
| 6,128,135 | A | * | 10/2000 | Stiles et al. | 359/597 |
| 6,299,317 | B1 | | 10/2001 | Gorthala | |
| 7,295,372 | B2 | | 11/2007 | Steneby | |
| 7,640,931 | B2 | * | 1/2010 | Tarabishi | 359/597 |
| 7,813,061 | B2 | | 10/2010 | Steneby | |
| 8,000,014 | B2 | | 8/2011 | Whitehead et al. | |
| 8,689,784 | B2 | * | 4/2014 | Monsebroten | 126/658 |
| 2010/0254010 | A1 | | 10/2010 | Whitehead et al. | |
| 2011/0272002 | A1 | * | 11/2011 | Liu | 359/597 |

FOREIGN PATENT DOCUMENTS

EP 1174658 1/2002

* cited by examiner

*Primary Examiner* — Christ Mahoney
(74) *Attorney, Agent, or Firm* — Fish & Tsang LLP

(57) ABSTRACT

A light collecting and disseminating apparatus is provided for use in harvesting sunlight from the exterior of a man-made structure, and providing light to the inside of the structure, via an opto-mechanical joint where sunlight would not normally be available. The internal arrangement of the collector allows for improved optical accuracy and performance over prior efforts. The apparatus is also characterized as possessing a low profile so as not to alter the appearance of buildings furnished with the invention. Further, light can be collected from any orientation and redirected through the opto-mechanical joint to a stationary light receiving port independent of the orientation of the collectors.

16 Claims, 18 Drawing Sheets

OPTO-MECHANICAL JOINT ASSEMBLIES

This application claims the benefit of priority to U.S. provisional application having Ser. No. 61/541,305 filed on Sep. 30, 2011, which is incorporated by reference herein in its entirety.

FIELD OF THE INVENTION

The field of the invention is light redirection technologies.

BACKGROUND

Core daylight illumination apparatus systems for buildings are intended to collect, concentrate and direct sunlight from the exterior of the building to internal workspaces for the purposes of replacing a portion of the normally required electrically powered lighting and of improving lighting quality within those workspaces. Widespread use of such systems in commercial workspaces could significantly reduce energy consumption and greenhouse gas emissions. To foster widespread usage, the building core daylight illumination systems must be cost effective, robust, and compatible with common commercial building design and construction practices.

Previous work on building daylight illumination has not been successful for a number of reasons. Passive daylighting efforts including skylights, vertical light pipes, and other methods of directing non-concentrated or untracked sunlight fail to meet commercial illumination standards over a practical area or during a reasonable percentage of the year and do not provide significant power savings. European Patent application no. 1174658, entitled "Light Carrier System for Natural Light", by Guzzini, discloses a basic apparatus which collects lights and passes it to the interior of the building through a diffuser. U.S. Pat. No. 6,299,317, "Method and apparatus for a passive solar day lighting apparatus system" by Ravi Gorthala has a Fresnel component, but a "passive" system of light transportation into the building. The collected light would not, therefore, be expected to travel efficiently any distance once inside the building envelope. Control of light distribution is also problematic due to the wide range of angles of light entering the building.

Previous active daylighting, herein referred to as "sunlighting", efforts also have significant limitations that affect system cost or life cycle. Designs that include an optical fiber mounted such that it moves with the tracking optics are limited by the resistance caused by the bulky array of moving fiber. Accurate tracking in those cases is costly to provide. One such patent is U.S. Pat. No. 7,295,372 to Parans Daylight discloses a system involving a convex and concave lens to focus sunlight onto transmitting fibers. U.S. Pat. No. 7,813,061, also to Parans Daylight, discloses light focusing lenses which are mobile via ball joints and mobile frames that move independently to change the direction of the lenses. The light collecting element and optical fibers receiving the collected light must also move with the apparatus, which creates problems in keeping the light collecting element aligned to collect sunlight efficiently, and leads to lost light as the optical fiber flexes.

Generally, designs that utilize long optical fibers from the collector to the lighting fixture are further limited by the properties of the optical fiber over long distances, which distances cause significant light losses due to bulk absorption and noticeable color spectrum shifts.

Although there are several patents and patent publications pertaining to the concept of concentrating sunlight, or suggesting moving to track the sun, no solutions are offered for a whole apparatus system to make sunlight illumination work in a real context. U.S. Pat. No. 5,169,456 discloses the mechanical aspect of a weather protected "two-axis solar collector mechanism". No contemplation is made of the necessary optical components of this mechanism, apart from the prediction that a Fresnel lens could be used.

Externally mounted lighting systems have been provided in Vancouver, Canada, using adaptive butterfly arrays of mirrors (United States Patent Publication 20100254010 and U.S. Pat. No. 8,000,014) and parabolic mirrors. Such systems have been able to deliver adequate luminous flux to the interior of the buildings they serve, but the physical aspects of these building "add-ons" are considerable, as they project up to four feet from the buildings' original exterior wall.

The extrinsic materials described herein (European Patent Application No. 1174659, U.S. Pat. Nos. 6,299,317, 7,295,372, 7,813,061, 5,169,456 and 8,000,014, and United States Patent Application Publication 20100254010) and U.S. Provisional Application Ser. No. 61/541,305 are incorporated by reference in their entirety. Where a definition or use of a term in an incorporated reference is inconsistent or contrary to the definition of that term provided herein, the definition of that term provided herein applies and the definition of that term in the reference does not apply.

The related art discloses solutions that have cost and performance issues related to relying on optical fiber to transport light over long distances, requiring high tracking accuracy required to minimize fiber diameter, and having reduced tracking mechanism accuracy limitations when needing to flex fiber. Thus, an improved manifestation of a building core sunlight illumination apparatus system that is more effective in terms of total cost per delivered lumen-hour, quality of delivered light, life cycle and suitability to inclusion in new commercial building construction or renovation is needed.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

SUMMARY OF THE INVENTION

The inventive subject matter provides apparatus, systems and methods in which one can construct an opto-mechanical joint that redirects light from a rotatable concentrating element to a fixed location. One aspect of the inventive subject matter includes a joint assembly comprising a light concentrating element mounted on a rotatable frame assembly. The concentrating element can be rotated about an azimuth axis or tilted around an altitude axis to ensure the concentrating element tracks a light source, the sun for example. The concentrating element can include a lens or non-imaging device that concentrates or converges light toward a fixed location. The joint assembly can further include a series of reflective surfaces that redirect the converging light to a fixed location relative to the axes regardless of the orientation of the concentrating element. In some embodiments, a light receiving port (e.g., a waveguide, an optic fiber, etc.) can be positioned at the fixed location to collect the incident converging light. The fixed location can be positioned at a non-focal point of the converging light to reduce hot spots.

Various objects, features, aspects and advantages of the inventive subject matter will become more apparent from the following detailed description of preferred embodiments, along with the accompanying drawing figures in which like numerals represent like components.

DETAILED DESCRIPTION

One should appreciate that the disclosed techniques provide many advantageous technical effects including routing natural light from an exterior portion of a structure to an interior portion of the structure. More specifically, the disclosed subject matter provides the technical affect of routing light along an optical path through an opto-mechanical joint to a fixed point regardless of the incident orientation of the light.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term “coupled with” and “coupled to” are intended to include both direct coupling (in which two elements that are coupled to each other contact each other) and indirect coupling (in which at least one additional element is located between the two elements).

Figure 1:
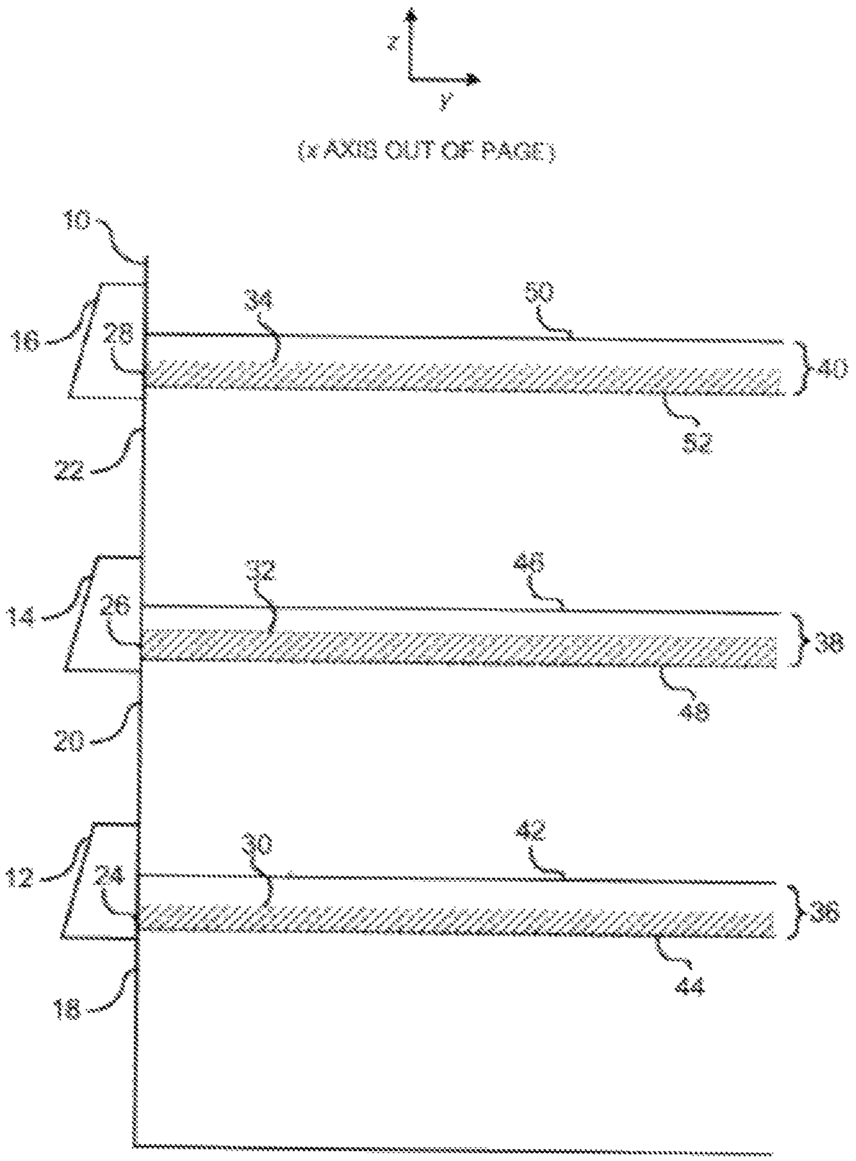
Figure 1 (Prior Art)
FIG. 1 presents a prior art schematic, fragmented, side elevation view of a 3-story portion of a building having prior art building core sunlight illumination system.
Figure 1A:
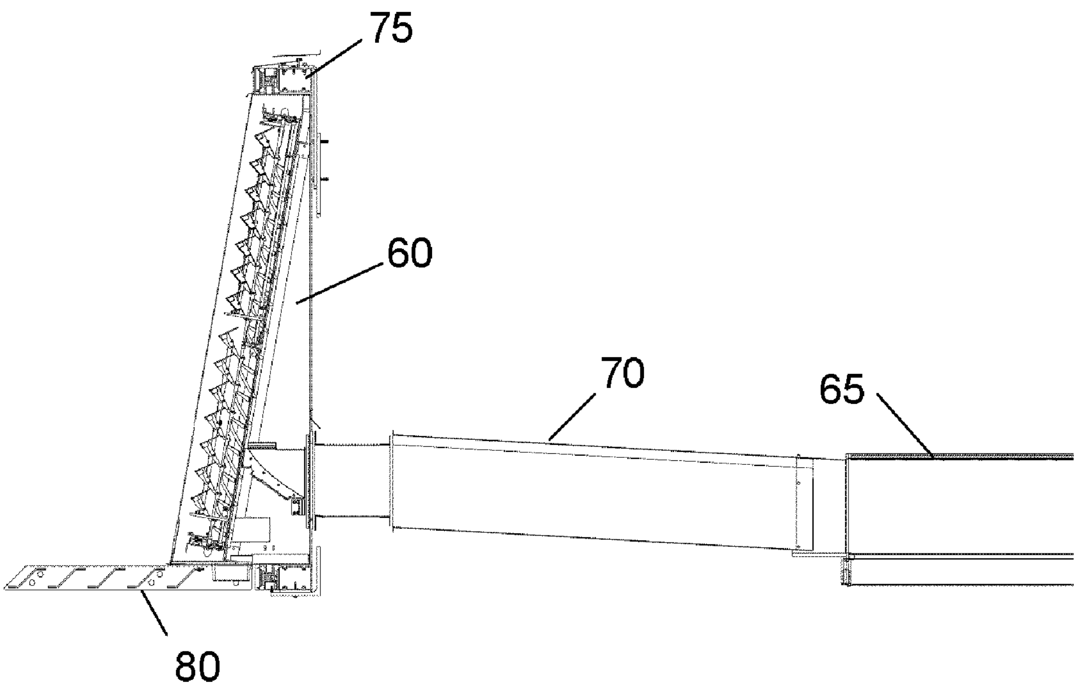
FIG. 1A illustrates a cross-sectioned side elevation of the disclosed building core sunlight illumination system. Also shown are an integrated sunshade and sections of curtain wall.

There is provided a core building sunlighting apparatus, an example of which is shown in FIG. 1A. The building core daylight illumination apparatus system comprises a concentrating panel 60 which collects, concentrates and re-collimates sunlight, and a light guide 65 which provides a reflective channel by which the sunlight is transmitted into the building core. The two components are typically connected by a transition funnel 70.

The depicted embodiment shows the concentrating panel 60 mounted in typical unified curtain wall 75 and integrated sunshade 80, although other mounting configurations are possible.

For comparison, prior art concentration panels or canopies 12, 14, and 16 is shown in FIG. 1 as part of a multi-storey building 10. Each one of concentration panels collects and redirects solar light into a corresponding light guide or sunlight distributors 30, 32, and 34. Note the bulkiness of the apparatus and how it alters the line of the building exterior.

Figure 2:
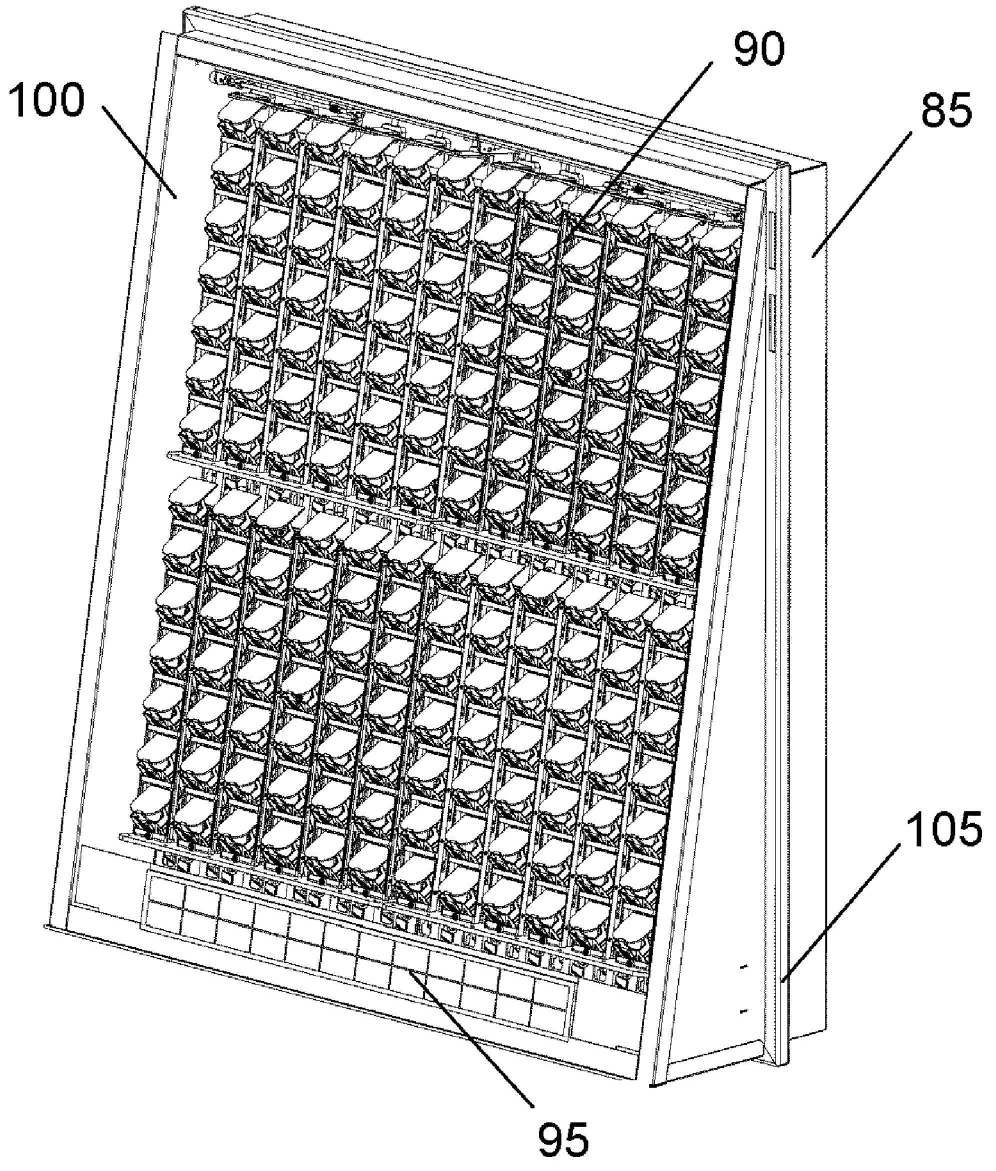
FIG. 2 illustrates an embodiment of a concentration panel.

FIG. 2 depicts a concentration panel which is a sealed, autonomously powered and controlled assembly that is able to be mounted on the outside of buildings, incorporated within the building envelope or mounted independently such as for a sun shade. Contained within or attached to the enclosure 85 are one or more collector assemblies 90, a stationary optical manifold (not shown), a collimator (not shown), a photovoltaic panel 95, the electronic controls printed circuit assembly (PCA) and a mounting frame underlying the assemblies.

The enclosure 85 can include an air-tight box constructed of sheet aluminum or other material on the rear and four side faces, and having a front glass panel 100 providing the front face. The front glass panel 100 can include a glass and vinyl lamination specified for maximum transmission of visible light and filtration of ultraviolet light. The front glass panel 100 is typically bonded to the enclosure 85 with glazing tape and silicone sealant per building construction specifications for structural strength and seal integrity.

A 1"×1" glazing fin 105 can extend around the side faces of the enclosure 85 at a position such that the concentration panel as shown generally in FIG. 2 can be easily mounted in the glazing pocket of common unitized curtain wall building systems.

Figure 2A:
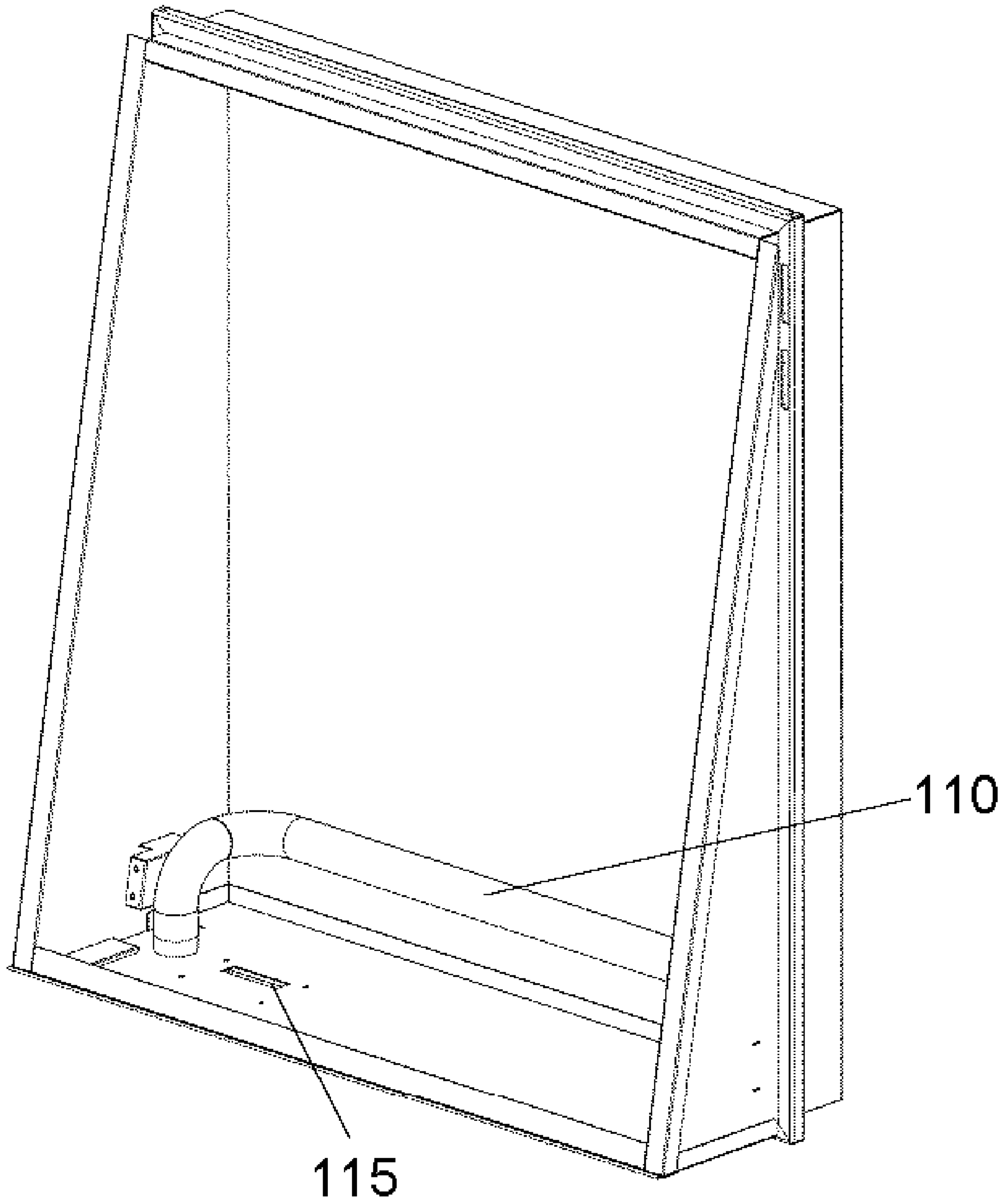
FIG. 2A presents the concentration panel of FIG. 2 with the mounting frame removed to show the enclosure interior details.

Within enclosure 85 as shown in FIG. 2A, there can be a desiccant tube 110 extending from a threaded port on the bottom face of the enclosure 85 into the interior of the enclosure 85. The pipe can be filled with a granular desiccant, which may be replaced onsite during routine maintenance in order to eliminate condensation within the enclosure.

Also shown is a pass-through printed circuit board (PCB) 115 which provides a sealed connection between electronic components mounted inside the enclosure 85 and the electronic controls mounted outside.

Figure 2B:
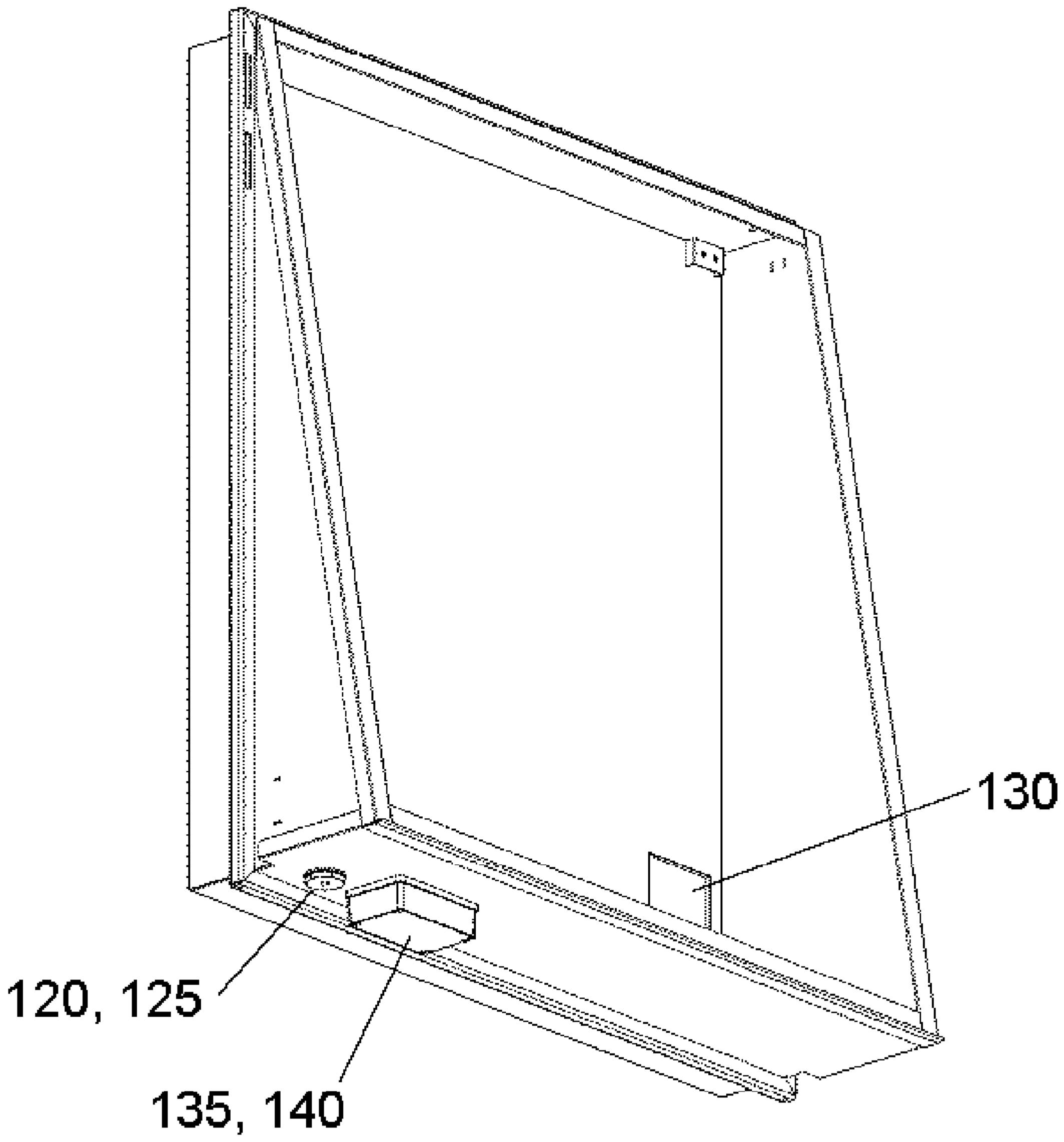
FIG. 2B presents a bottom view of the concentration panel of FIG. 2 depicting the desiccant plug and electrical box location.

The port of the desiccant tube 110, seen in FIG. 2B, is sealed with a threaded plug 120 that has an incorporated membrane vent 125. The enclosure is thus able to breathe through the desiccant such that, within the enclosure 85, pressure equilibrium with atmosphere is maintained while internal moisture content is controlled.

Flashing details, ridgelines or surface features around the enclosure 85 may be incorporated into concentration panel ensure proper water drainage and allow for multi-unit sealing similar in appearance to current unitized curtain wall with structural silicone glazing.

The rear glass panel 130 seen in FIG. 2B, is where the output sunlight is ported out of the concentration panel. Rear glass panel 130 is specified for maximum light transmission and includes an anti-reflection coating, and can be bonded to the enclosure 85 with glazing tape and silicone sealant for seal integrity.

The electronics controls PCA can be connected to the pass-through PCB 115 on the outside of the enclosure 85 and covered with a removable electronics cover 135 and electronics gasket 140 for onsite access.

Figure 3:
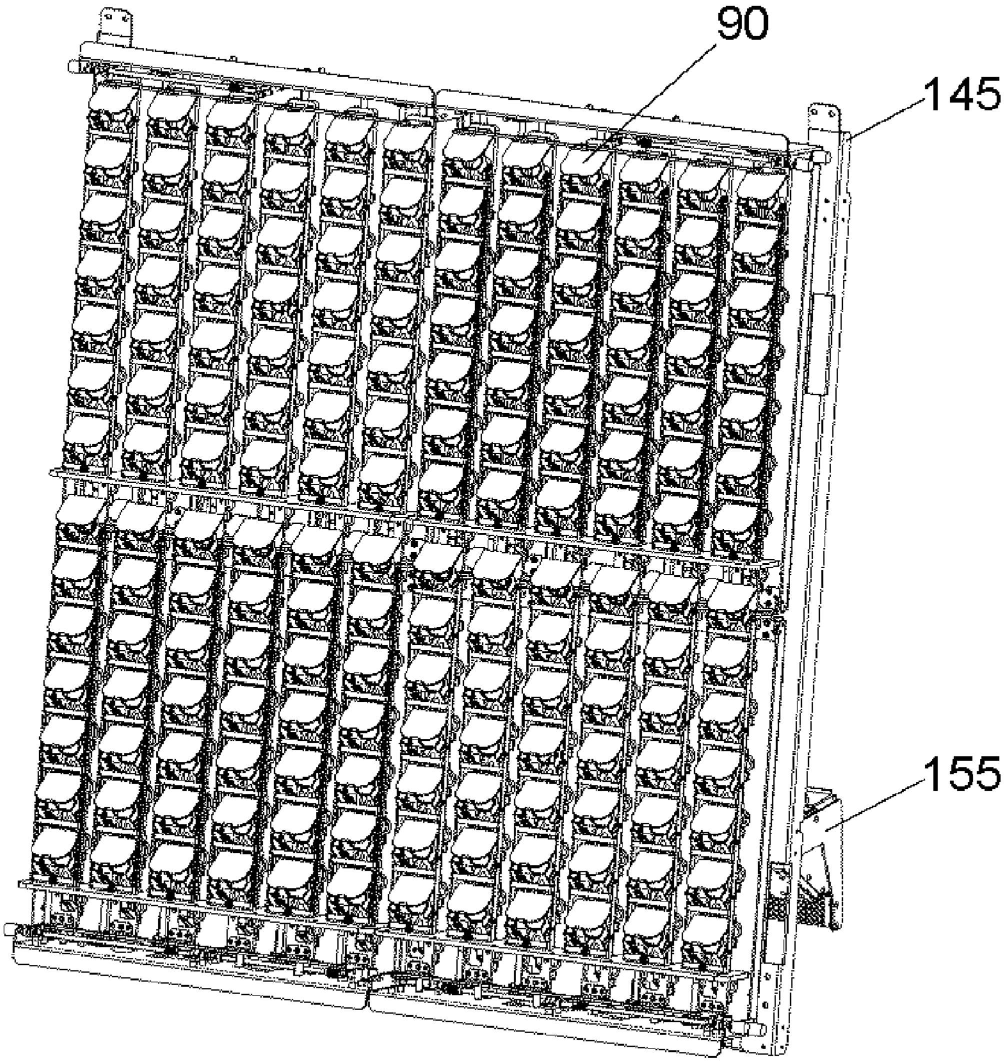
FIG. 3 illustrates a populated mounting frame.
Figure 3A:
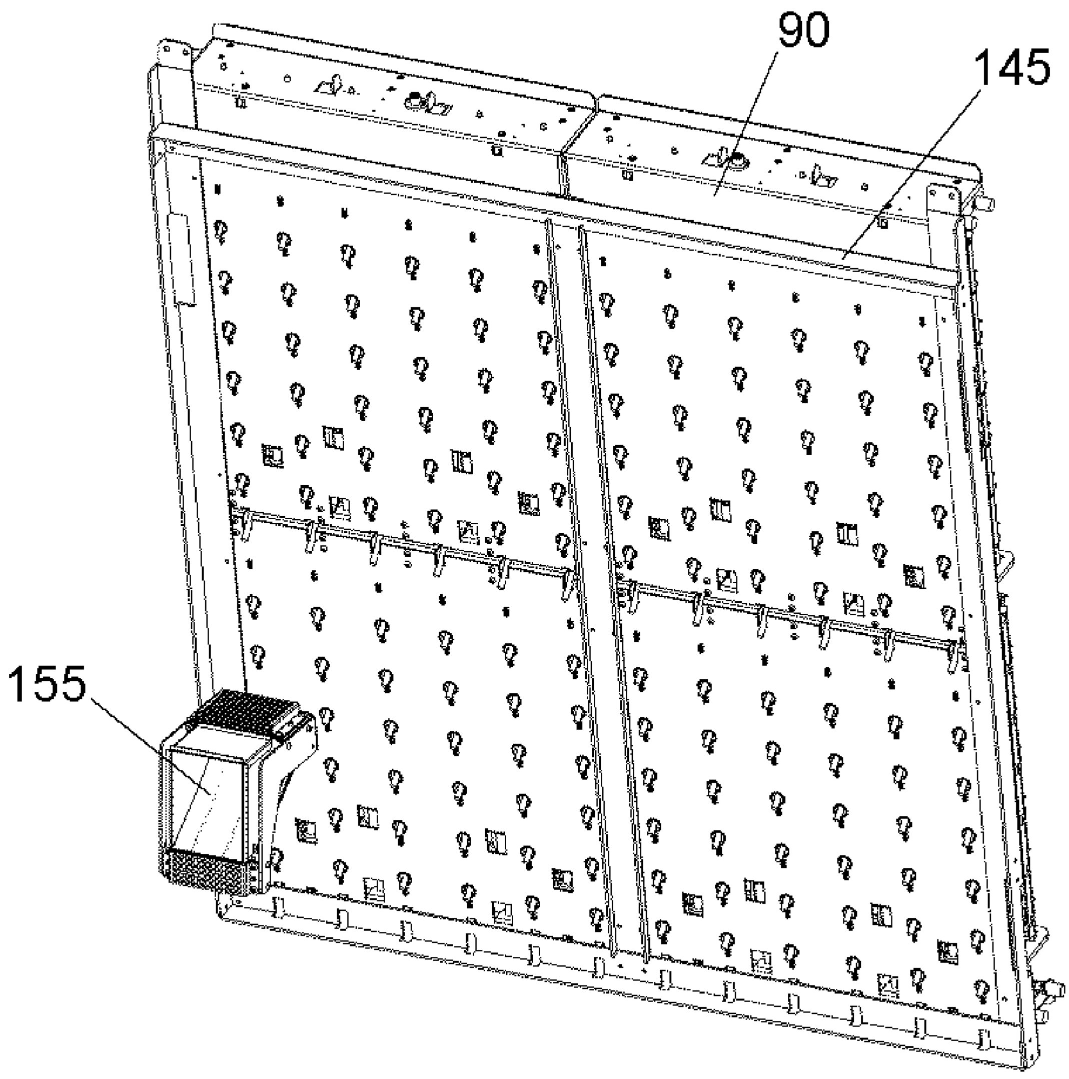
FIG. 3A presents the populated mounting frame of FIG. 3 where the stationary optical manifold is shown fragmented.

FIGS. 3 and 3A depict a populated mounting frame 145. The mounting frame 145 has attached to it four collector assemblies 90 in a 2×2 array, the stationary optical manifold (not shown) and the collimator 155 at the read of mounting frame 145. Once populated, the mounting frame 145 is secured within the enclosure 85. One should appreciate that the number of collector assemblies 90 coupled to mounting frame 145 can be varied according to a desired implementation or deployment. Collector assemblies 90 can be arranged according to other arrays including 1×1, 1×2, 2×1, or other N×M array where N=M or N≠M.

Figure 4:
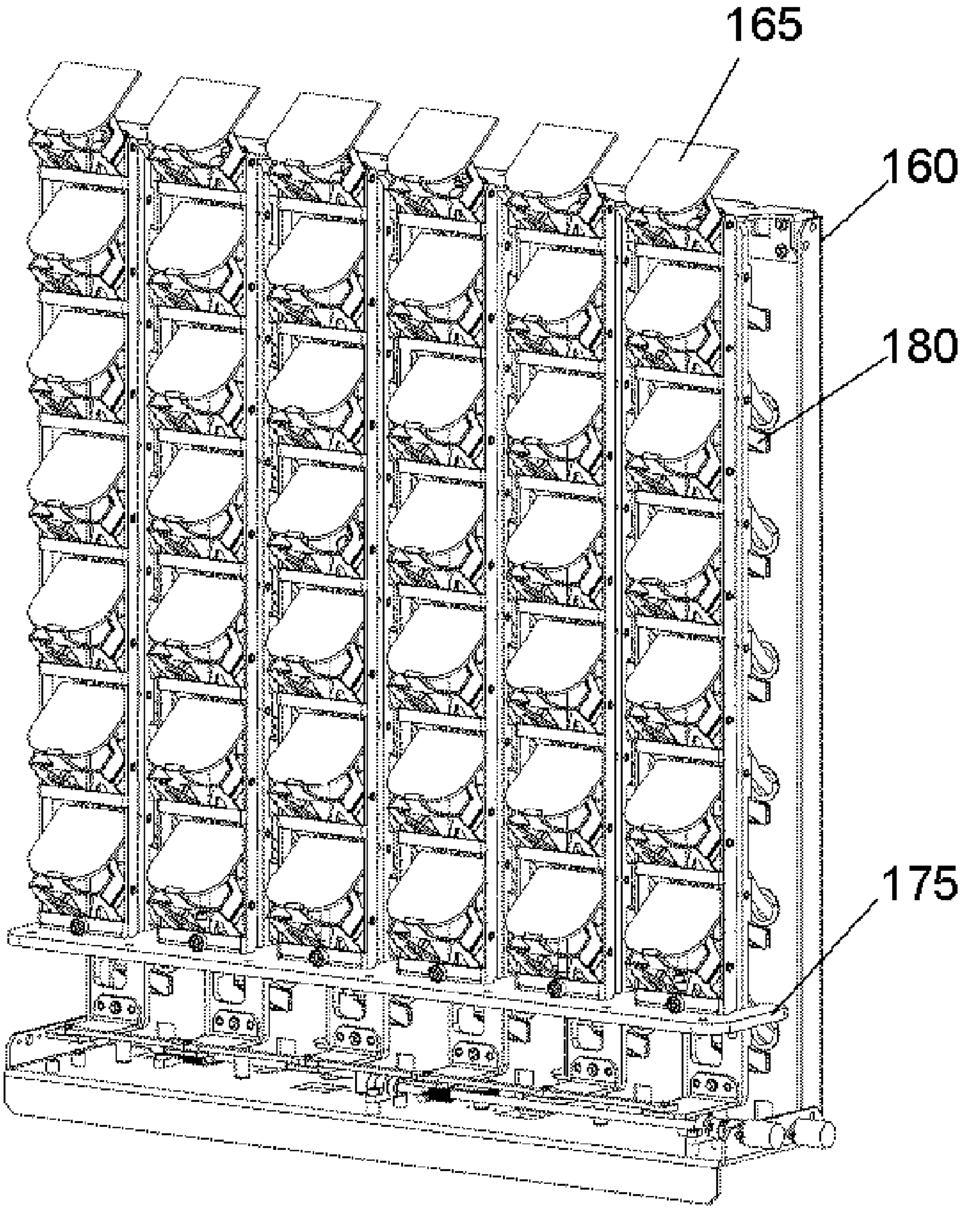
FIG. 4 illustrates a lower variant of a collector assembly.

In FIG. 4, an exemplary single collector assembly 90 is pictured, which includes all optical and mechanical elements required for the tracking of the sun and the collection and concentration of sunlight. The collector assembly 90 consists of a chassis 160 upon which is mounted a linear array of optical frames 165, an altitude platform 175, fiber holders 180, as well as geared drive mechanisms, rotary encoders, and stepper motors for both altitude and azimuth axes.

Figure 4A:
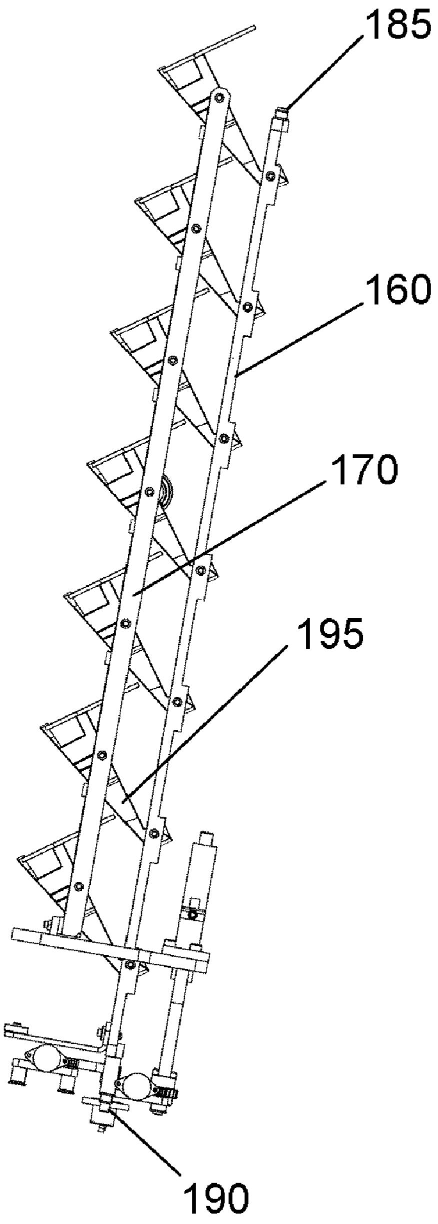
FIG. 4A presents a side view of the collector assembly of FIG. 4 with chassis removed from view.

FIG. 4A depicts the biaxially-mobile mechanical assembly which supports and drives the arrayed optical frames 165. The upper and lower pivot pins 185, 190 of each optical frame 165 are mounted in bushings in the chassis such that they can pivot freely and in parallel about their azimuth axes. On each optical frame 165 an altitude frame 170 is attached to each lens holder 195 with pins and bushings such that all the lens holders 195 in the optical frame 165 are linked in a multiple parallelogram four bar mechanism arrangement. The movement of the altitude frame up or down causes all the lens holders 195 to move simultaneously and in parallel about their altitude axes.

Figure 4B:
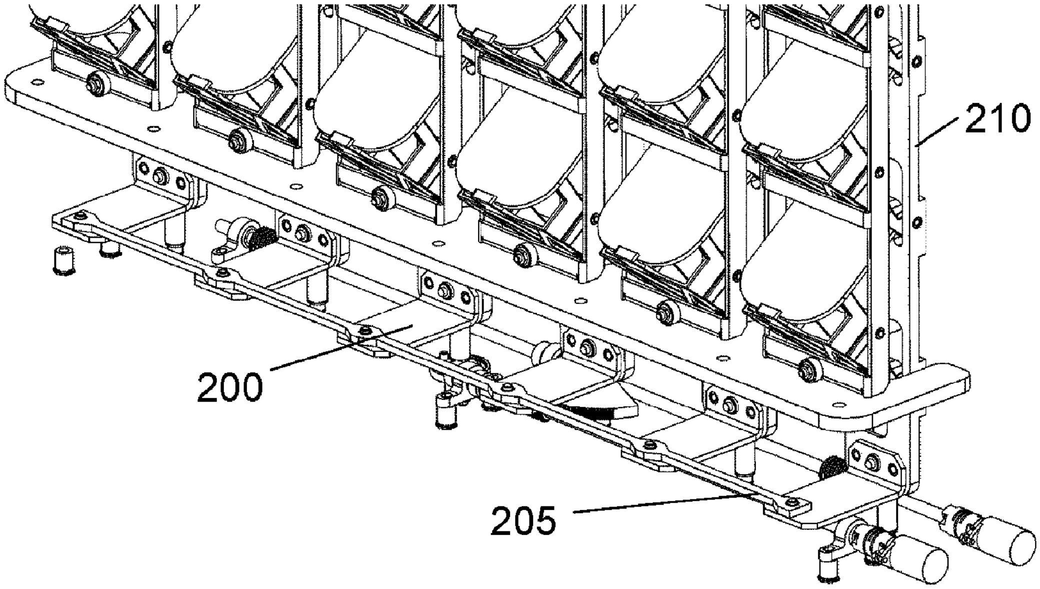
FIG. 4B presents a detail view of a lower portion of the collector assembly of FIG. 4.

In FIG. 4B, linkage arms 200 are attached to the azimuth frames and are in turn connected by pin and bushings to a common linkage bar 205 in a multiple parallelogram four bar mechanism arrangement. The movement of the azimuth frames 210 about their azimuth axes is thus constrained to be simultaneous and parallel.

Figure 4C:
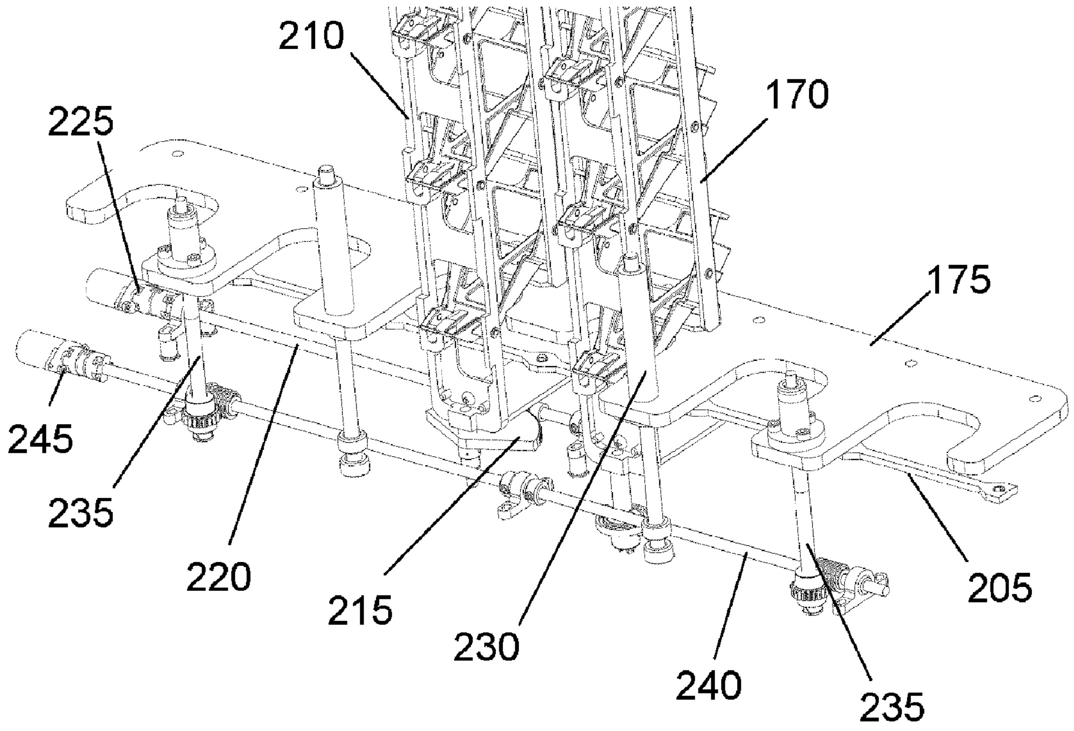
FIG. 4C presents a detail rear view of a lower portion of the collector assembly of FIG. 4.

A detailed drawing of possible drive assemblies for both axes is shown in FIG. 4C. The optical frames 165 are both rotated about their azimuth axes and held in position by a worm gear set, with the worm gear 215 being mounted on the pivot pin of one of the optical frames 165 and the worm being mounted on the azimuth drive shaft 220. A stepper motor 225 is mounted on the chassis and linked by a flexible coupling to the azimuth drive shaft 220.

The altitude frames 170 of each optical frame 165 are supported on the flat altitude platform 175. A roller bearing on each altitude frame 170 is the contact point with the altitude platform 175. The roller bearing sits freely on the altitude platform 175 and is free to translate in any direction. By moving the altitude platform 175 up or down, all altitude frames 170 are moved simultaneously and in parallel, and thus all lens holders 195 are similarly moved simultaneously and in parallel about their altitude axes. The altitude platform 175 is indexed up and down via a linear slide mechanism 230 that is driven by two lead screws 235 which are in turn driven by a worm gear sets with the worm gear mounted on the two lead screws and the worms mounted on a common altitude drive shaft 240. A stepper motor 245 is mounted on the chassis and linked by a flexible coupling to the altitude drive shaft 240.

Figure 5:
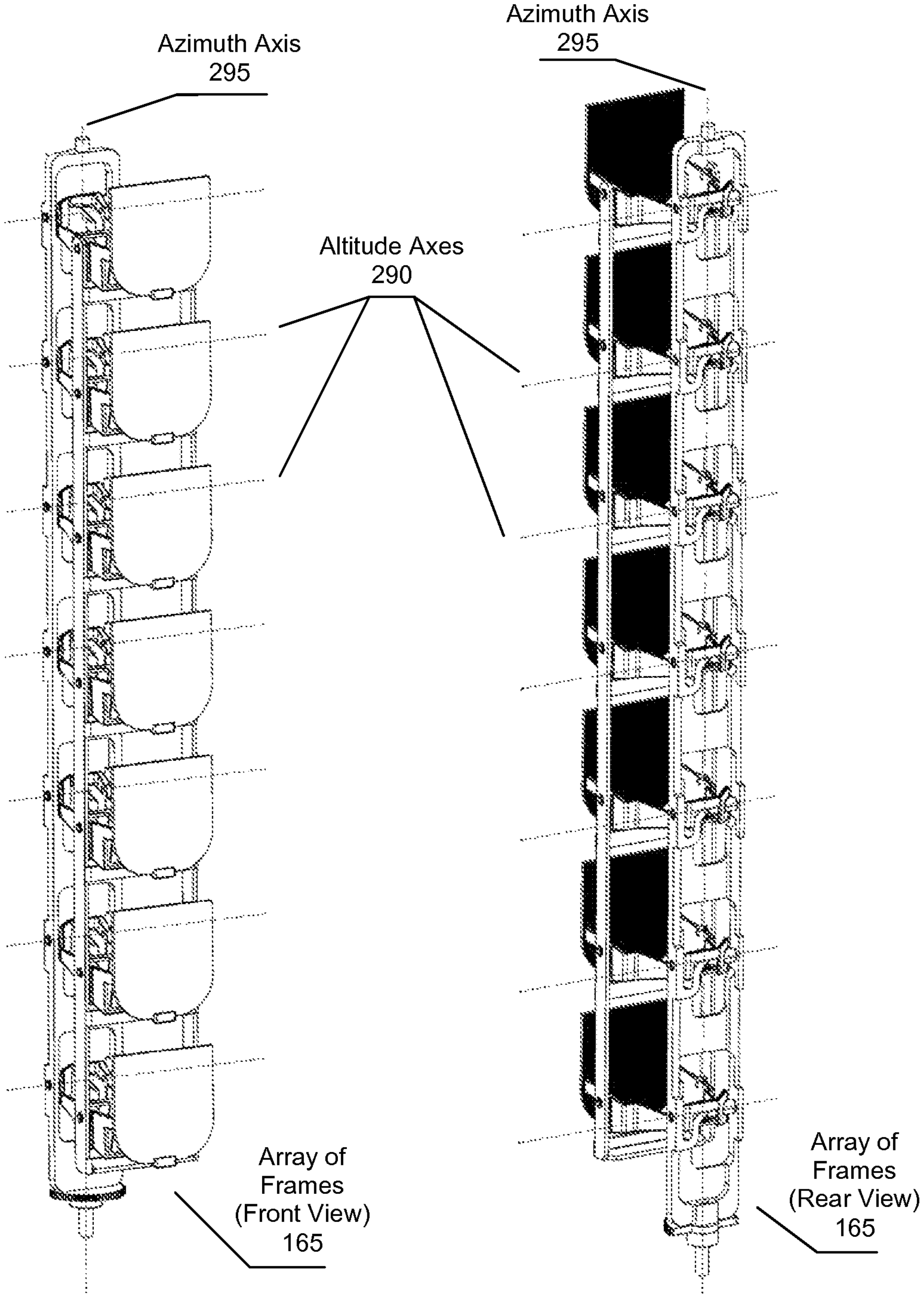
FIG. 5 illustrates a front and rear view of a single optical frame.

FIG. 5 provides an overview illustration of a front and rear view of single optical frame 165. The azimuth axis 295 of frame 165 and altitude axis 290 of each lens holder 195 are shown. Thus, optical frame 165 can rotate about the azimuth axis and each lens holder 195 can tilt up or down by rotating around their corresponding altitude axis 290.

Figure 5A:
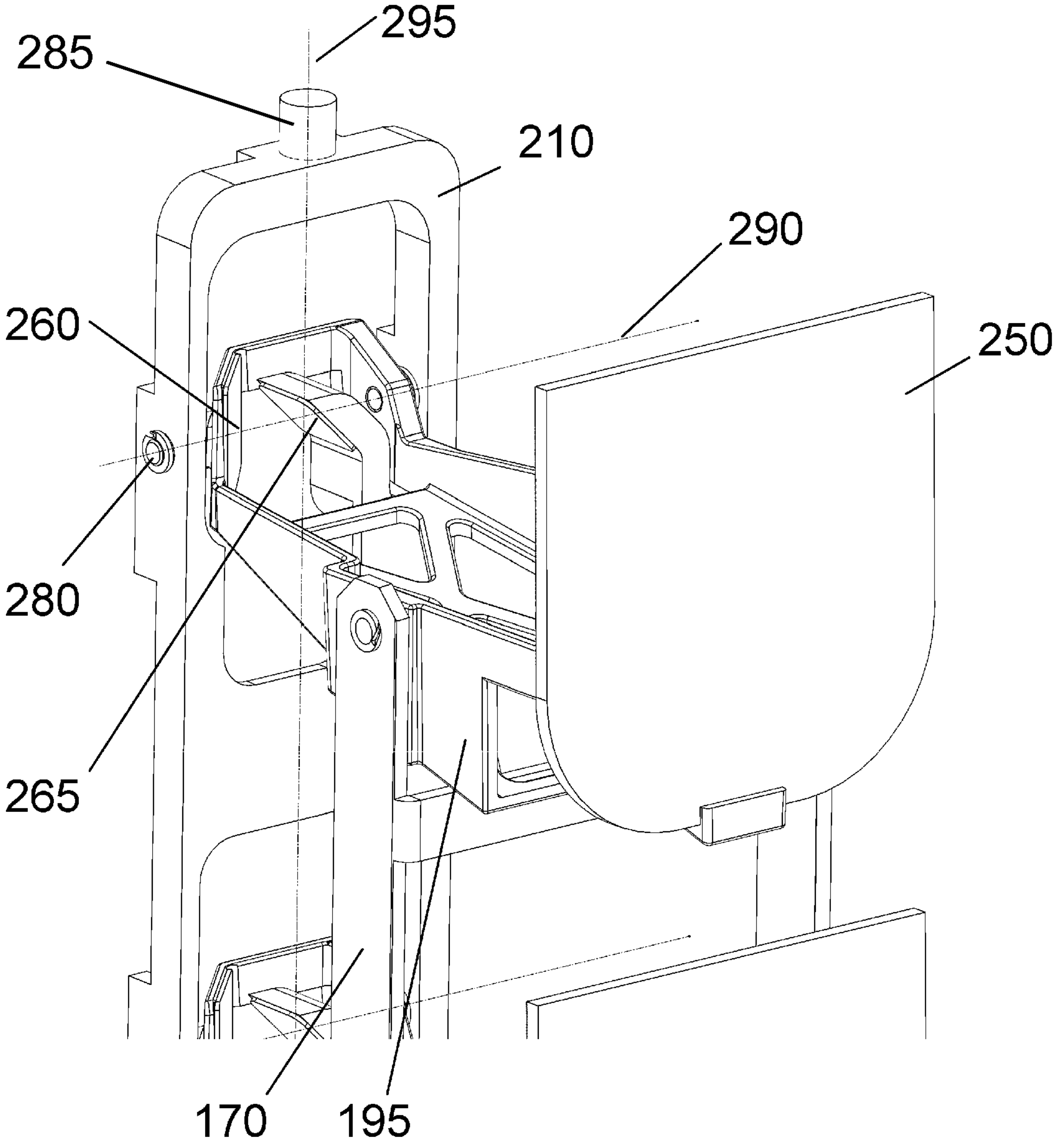
FIG. 5A presents a more detailed front view of a concentrating element in the single optical frame of FIG. 5.

FIG. 5A depicts an example one of the arrayed opto-mechanical component sets from the optical frame 165, which includes an azimuth frame 210, a concentrating element 250 mounted on a lens holder 195, and an altitude frame 170 and the related mechanical structure and pivot points.

The concentrating element 250 can be a Fresnel or other imaging lens or a non-imaging device such as a waveguide or Winston cone. The preferred configuration of the concentrating element 250 is to be constructed such that the resultant optical path is directed off-axis from the geometrical center line of the lens holder 195. This arrangement ensures that the mechanical pivot points 280 and 285 can be coincident with the altitude axis 290 and azimuth axis 295 of the mechanical tracking assembly and that the pivot axes are symmetrical with the physical center lines of the lens holder 195. The symmetry thus defined ensures the maximum packing density of concentration elements 250 in all tracking positions.

Figure 5B:
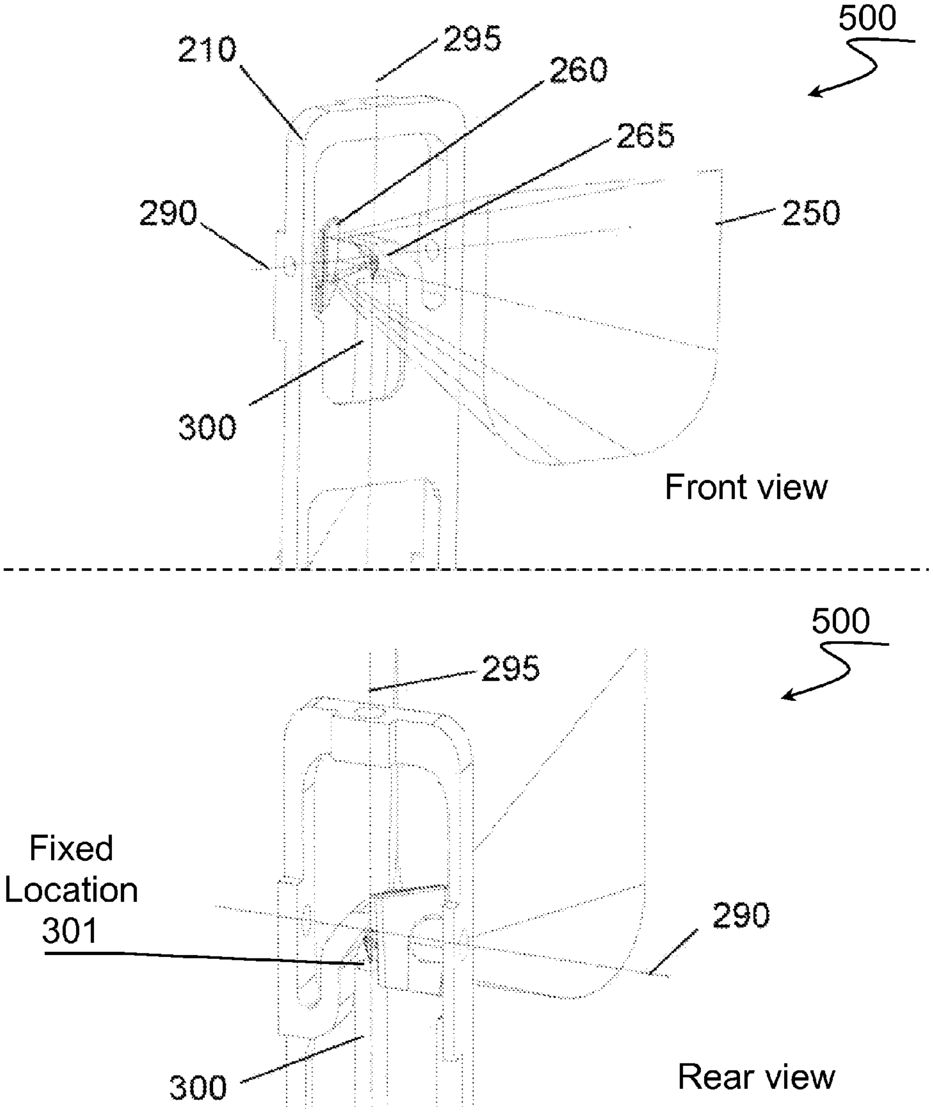
FIG. 5B presents a more detailed view illustrating an optical joint behind the concentrating element in the single optical frame of FIG. 5.

FIG. 5B schematically depicts the light path from the concentrating element 250 and through an opto-mechanical joint assembly 500. As illustrated opto-mechanical joint assembly 500 typically comprises light concentrating element 250 mounted on a rotatable frame assembly configured to rotate about at least two axes. For example, the rotatable frame assembly can include a concentrator holder (see lens holder 195 in FIG. 5A) able to rotate around altitude axis 290 and azimuth frame 210 able to rotate about azimuth axis 295.

The opto-mechanical joint assembly 500 can comprise of a series of reflective surfaces represented by two orthogonally rotating reflective surfaces 260, 265. Reflective surfaces 260 and 265 can be arranged in a manner that folds or redirects the converging light from concentrating element 250 along an optical path such that the optical path is directed to a fixed location 301 regardless or independent of orientation of the concentrating element 250 about the two tracking axes 290, 295. This arrangement makes possible a stationary interface point represented by fixed location 301 with the balance of the system thus eliminating variable loads on the mechanical drives during tracking or physical wear on the optical components.

One should appreciate that the fixed location 301 in the example illustrated comprises a light receiving port in the form of an end of optic fiber 300. The light receiving port could also include other forms of waveguides other than an optic fiber. Fixed location 301 substantially remains stationary relative to the azimuth axis 295 and altitude axis 290 regardless of how frame 210 rotates or how lens holder 195 tilts. In some embodiments, frame 210 can comprise one or more optic fiber holders (e.g., clips, glue, etc.) that hold optic fiber 300 in place relative to the frame 210. In such cases, optic fiber 300 can rotate with frame 210 about azimuth axis 295 while the light receiving end of optic fiber 300 remains stationary. In other embodiments, optic fiber 300 can be held stationary by being mounted to other non-moving structures (e.g., enclosures, frames, etc.) in a manner that substantially maintains the receiving end of optic fiber 300 at a fixed location.

When concentrating element 250 is aligned to receive direct natural sunlight, it collects and focuses or concentrates the light as a converging light beam. Prior to reaching the focal or concentration point the converging light is reflected by the first reflective surface 260 and directed along the altitude axis 290 of the lens holder 195.

Then, still prior to reaching the focal or concentration point, the converging light is reflected by the second reflective surface 265, which is mounted on the azimuth frame 210, and directed along the azimuth axis 295 toward the fixed location 301 of the receiving end of optic fiber 300. Through the two reflections along orthogonal axes 290 and 295, the focal or concentration point is stationary relative to orthogonal translation in the focal plane. Thus, the converging light is incident on the light receiving port located at fixed location 301. One should appreciate the fixed location 301 is considered substantially fixed relative to opto-mechanical joint assembly 500 or more specifically fixed relative to axes 290 and 295. As can be see, fixed location 301 also remains substantially stationary relative to an intersection of axes 290 and 295.

Figure 6:
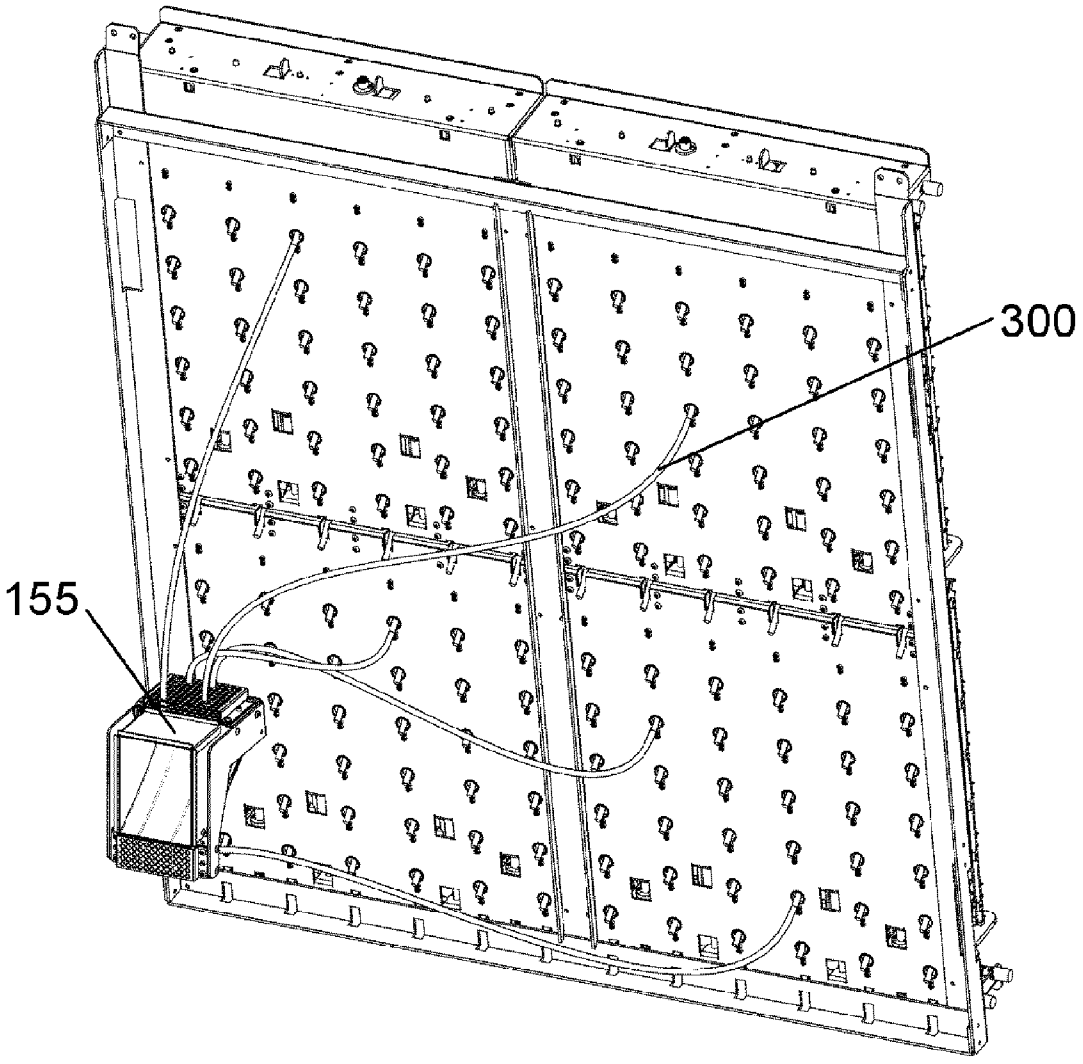
FIG. 6 illustrates a rear view the stationary optical manifold where the stationary optical manifold is shown with several optical fibers.

In FIG. 6, the stationary optical manifold 150 is shown from the rear. Concentrated sunlight from the output of each opto-mechanical joint is guided to the collimator 155 along optic fibers 300. In this embodiment, the stationary optical manifold 150 is composed of a set of plastic optical fibers 300 (only some are shown in FIG. 6, for clarity). Other embodiments of the stationary optical manifold 150 can include a molded acrylic plate or rigid optical fiber assemblies. Care is taken to route the plastic optical fibers to minimize curvature, and so minimize the increase in optical angularity and loss of efficiency caused by such curvature.

The plastic optical fibers 300 can be held in place and orientation at the focal or concentration points of the opto-mechanical joints by fiber holders 180 (see FIG. 4) which are mounted on chassis 160. The fiber holder 180 can be constructed of a metal in order to conduct heat away from the focus or concentration point. Thus, fiber holder 180 can comprises a heat sink. The "face" or end of the plastic optical fiber is typically held just inside or outside of the focal point, such that the amount of concentration is minimized while maintaining full collection. This configuration reduces the surface temperature at the face of the plastic optical fiber and thus mitigates the related thermal degradation effects. The position of the fixed location of the light receiving port of optic fiber 300 is positioned where the area subtended by the light receiving port, $A_{of}$, is commensurate with the cross sectional area subtended by concentrated light, $A_{cl}$, at that point just outside the focal point. The ratio of the areas $A_{of}/A_{cl}$ is preferably within 10%, more preferably within 5%, and yet more preferably within 1% of value of one.

Figure 7:
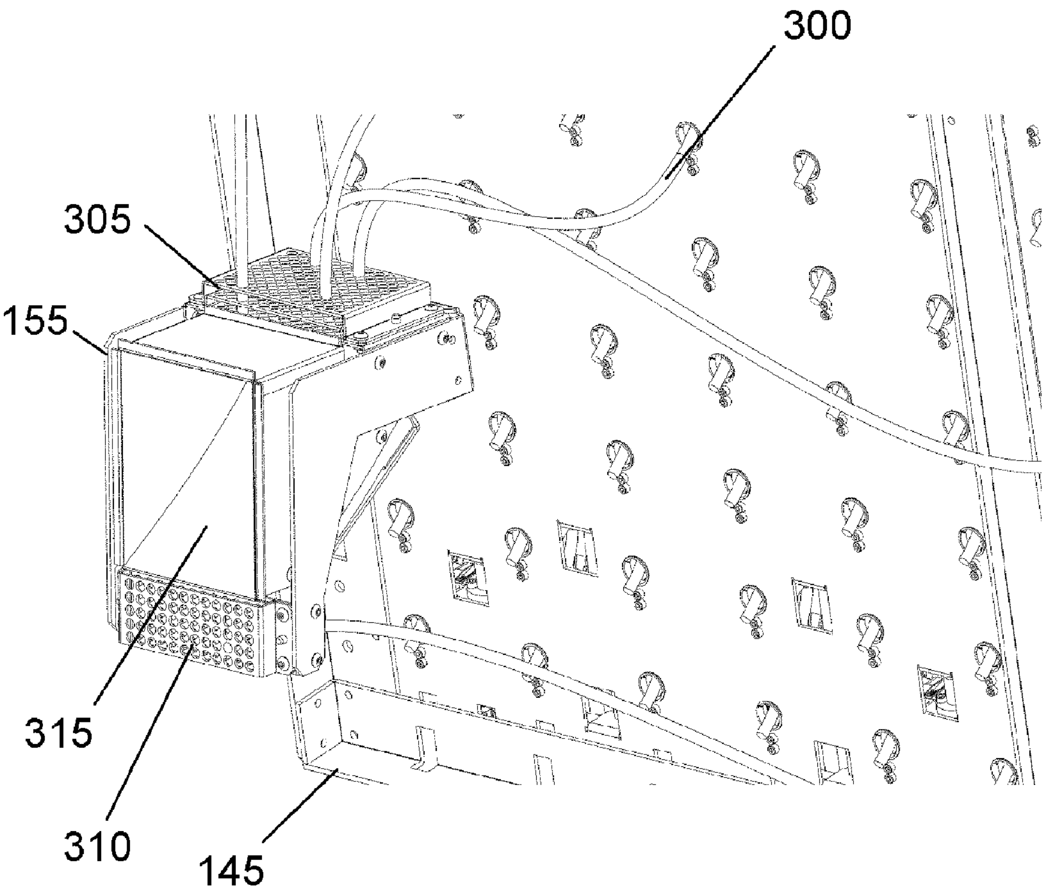
FIG. 7 illustrates a rear detailed view of the collimator.

FIG. 7 depicts collimator 155, which receives the output from each opto-mechanical joint in the enclosure 85 via the stationary optical manifold 150 and then combines, re-collimates and redirects the aggregate sunlight through the rear glass panel 130 on the enclosure 85 and then into the entrance of the hybrid light guide 65.

Light guide performance is predicated on the intensity and degree of collimation of the injected sunlight. The higher the degree of collimation of the sunlight the further the depth of penetration that is possible into a building core or other internal portions of a structure. Sunlight is inherently collimated but the collection, concentration and transport through various mediums and optical components tends to increase the angularity of the exiting light. Sunlight emerging from the exit face of the plastic optical fibers of the stationary optical manifold will therefore benefit from re-collimation for optimal performance of the light guide.

The collimator 155 is mounted on the rear of the mounting frame 145. The collimator 155 includes two perforated racks 305, 310 for holding the end faces of the plastic optical fibers 300 of the stationary optical manifold 150 such that the optical axis of each fiber is parallel. The collimator mirror 315 is a highly reflective surface held in a specific parabolic shape intended to optimize the collective collimation of the output in the vertical plane from the aggregated plastic optical fibers 300 mounted in the upper rack 305.

Figure 7A:
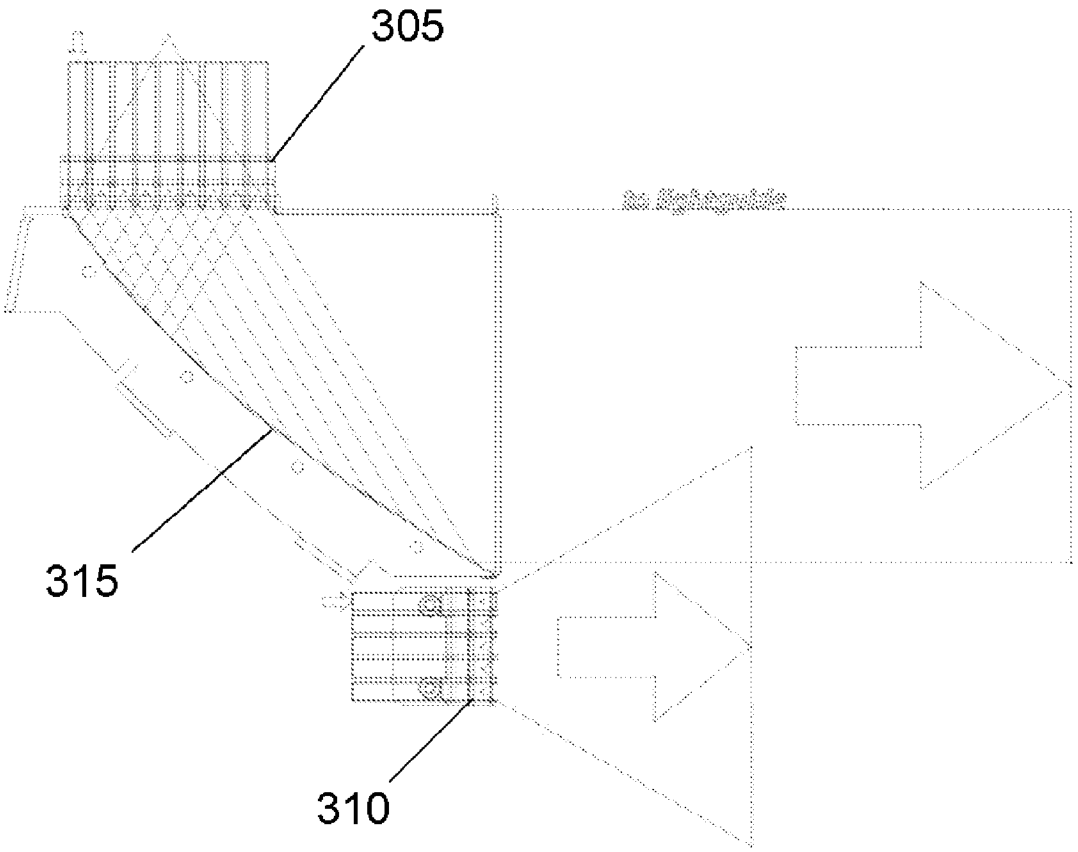
FIG. 7A presents a side cut view the light path from the stationary optical manifold through the collimator shown in FIG. 7.

FIG. 7A schematically depicts the aggregated optical path. The upper rack 305 is oriented such that the optical axis of attached fibers will be perpendicular and centered to the collimator mirror 315 entrance. The lower rack 310 is oriented to allow the plastic optical fibers 300 from the lower corner section of the mounting frame 145 to have their optical axis oriented directly toward the rear glass panel 130 without requiring severe curvature in the fibers. Although the output from these fibers is not re-collimated, it is generally parallel with the output from the collimator mirror 315. Thus the sunlight output from all opto-mechanical joints within the concentration panel are combined and concentrated in a single, mostly re-collimated, beam which is directed into the hybrid light guide 65.

Figure 8:
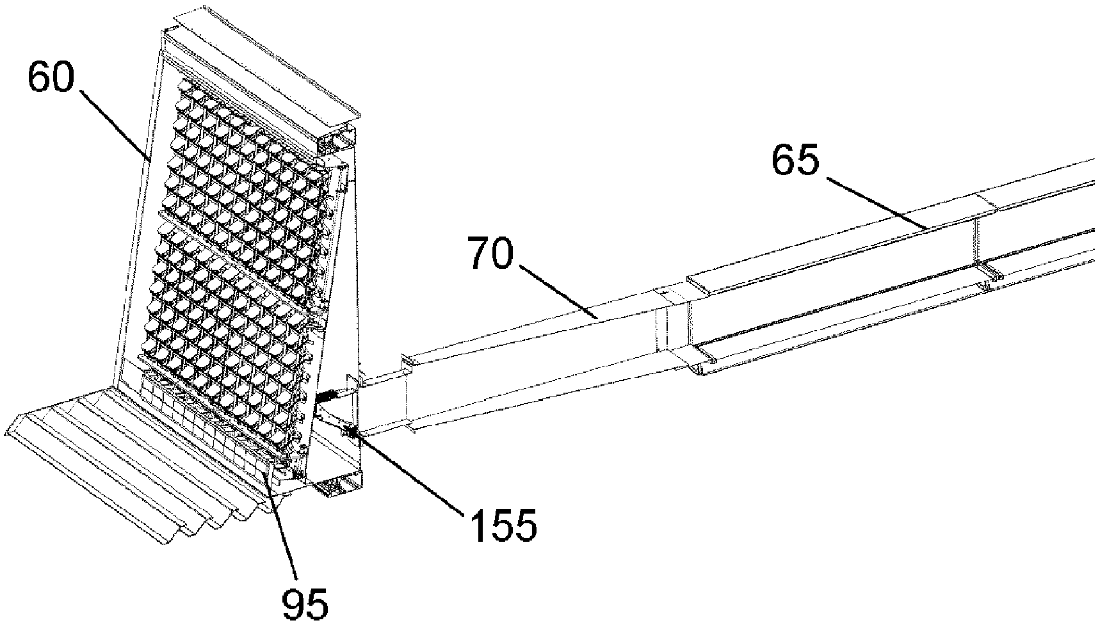
FIG. 8 illustrates a cut-away view of a building core sunlight illumination system.

FIG. 8 shows an example of an embodiment of a complete optical system for collecting and distributing sunlight as disclosed. A typical light guide 65 includes mechanical construction with prismatic or multi-layer optical film as the primary reflective surface, and extraction film distributed to provide balanced light levels along the length of the light guide. The preferred embodiment of this disclosure includes a hybrid light guide. The hybrid light guide 65 includes integrated fluorescent lamps or other electrically powered light sources along the length of the light guide. The fluorescent lamps supplement the sunlight when it is below a set level of luminance during the day and generally during night operations.

Control of the sunlight and fluorescent mix is achieved by monitoring the environmental light levels with light level sensors mounted on the light guide. The transition from one lighting mode to the other is done such that the occupants of the illuminated area are unaware of the transition. Thus, the hybrid light guide is able to supply a pre-selected level of illuminance at any time of day or in any weather condition.

The transition funnel 70 is the channel from the concentration panel 60 to the hybrid light guide 65. It is optically optimized for improved collimation by a hollow funnel that expands from a size approximating the rear window of the concentration panel to a size that mates with the entry of the light guide. The transition funnel 70 is lined with highly reflective material. The funnel shape is sized such that light rays that are emerging from the concentration panel 60 at an angle are redirected to a path close to parallel with the center line of hybrid light guide 65.

In applications where the concentration panel 60 is mounted within the building envelop wall and the rear of the panel is directly accessible to the interior of the building, the transition funnel 70 mounts directly to both the concentration panel 60 and the corresponding hybrid light guide 65. In applications where the concentration panel 60 is mounted external to the building envelope, the light path must pass through a sealed window panel such that the building envelope is not breached. In this case there will generally be additional light ducting lined with highly reflective material to span the distance from the outside concentration panel 60 to the transition funnel 70.

The concentration panel 60 as disclosed is autonomous of all wire connections to the building. The concentration panel 60 can therefore be mounted on a building independent of electrical power or data hookup. Power for the control electronics and motion control is self-generated by a photovoltaic panel 95 that is mounted at the lower edge of the front glass panel 100. Communication with the light level sensors mounted on the hybrid light guides 65, with the building lighting automation system and for all post-installation calibration or firmware upgrades is accomplished through a wireless communication link.

In the example shown in FIG. 8 the concentration panel 60 has a 10 degree slope but the panel could be mounted vertically or have greater or lesser slopes.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An opto-mechanical joint assembly comprising a light concentrating element mounted on a rotatable frame assembly configured to rotate about at least two axes, wherein the light concentrating element comprises a lens;

a series of reflective surfaces including at least first and second reflective surfaces and arranged to redirect converging light from the light concentrating element along an orthogonal light path between the first reflective surface and a fixed location independent of an orientation of the rotatable frame assembly;

a light receiving port configured to remain substantially stationary at the fixed location relative to the at least two axes; and wherein the fixed location of the light receiving port is positioned in the path of the converging light at a point near, but not at a focal point of the concentrating element.

2. The joint assembly of claim 1, wherein the at least two axes comprise orthogonal axes.

3. The joint assembly of claim 1, wherein the at least two axes include an azimuth axis.

4. The joint assembly of claim 3, wherein the rotatable frame assembly comprises an azimuth frame coupled with the concentrating element and configured to rotate about the azimuth axis.

5. The joint assembly of claim 1, wherein the at least two axes include an altitude axis about which the concentrating element tilts.

6. The joint assembly of claim 5, wherein the rotatable frame assembly comprises a light concentrator element holder configured to rotate about the altitude axis.

7. The joint assembly of claim 1, wherein the fixed location remains stationary with respect to an intersection of the at least two axes.

8. The joint assembly of claim 1, wherein at least one of the reflective surfaces redirects the converging light along at a first axis of the at least two axes.

9. The joint assembly of claim 8, wherein a second, different one of the reflective surfaces redirects the converging light along at a second, different axis of the at least two axes.

10. The joint assembly of claim 1, wherein the light concentrating element comprises a Fresnel lens.

11. The joint assembly of claim 1, wherein the light concentrating element comprises a non-imaging light concentrating device.

12. The joint assembly of claim 1, wherein the light receiving port comprises an optic fiber.

13. The joint assembly of claim 12, wherein the light receiving port comprises an end of the optic fiber.

14. The joint assembly of claim 1, wherein the light receiving port is configured to not rotate while remaining at the fixed location when the rotatable frame assembly rotates.

15. The joint assembly of claim 1, wherein the light receiving port comprises a light receiving area that is commensurate with a cross sectional area of the converging light at the fixed location.

16. The joint assembly of claim 1, wherein the light receiving port comprises a waveguide.

* * * * *